(12) United States Patent
Miller (10) Patent No.: US 9,308,854 B2
(45) Date of Patent: Apr. 12, 2016

(54) CARGO FLOOR ANCHORS

(71) Applicant: Robert W. Miller, Huntington Beach, CA (US)

(72) Inventor: Robert W. Miller, Huntington Beach, CA (US)

( * ) Notice: Subject to any disclaimer, the term of this patent is extended or adjusted under 35 U.S.C. 154(b) by 153 days.

(21) Appl. No.: 14/132,876

(22) Filed: Dec. 18, 2013

(65) Prior Publication Data

US 2015/0165961 A1    Jun. 18, 2015

(51) Int. Cl.
*B60P 7/08*    (2006.01)

(52) U.S. Cl.
CPC .................................... *B60P 7/0807* (2013.01)

(58) Field of Classification Search
CPC .......... B60P 3/079; B60P 7/08; B60P 7/0807; B60P 7/0815; B60P 7/0823; B61D 45/001
USPC ........... 410/97, 101, 102, 106, 107, 110, 111, 410/115; 24/115 K, 265 CD; 248/499
See application file for complete search history.

(56) References Cited

U.S. PATENT DOCUMENTS

| | | | | |
|---|---|---|---|---|
| 3,893,399 A | * | 7/1975 | Lewis et al. | 410/112 |
| 4,008,669 A | * | 2/1977 | Sumrell | 410/47 |
| 4,484,847 A | * | 11/1984 | Holmes | 410/104 |
| 6,241,440 B1 | * | 6/2001 | Orlebeke | 410/106 |

* cited by examiner

*Primary Examiner* — Stephen Gordon (57) ABSTRACT

A floor anchor assembly for cargo vans that mounts totally below surface of cargo floor, but will provide for tie-down attach points above the cargo floor. Such anchor assemblies combine a rigid frame with a high strength web-cable that forms a loop. The web-cable loop from the anchor will rout through the center of the anchor and extend upward to pass through a narrow slot cut into the cargo floor panel. When the loop end is fully extended, the top of the loop will be just above floor surface for use as a tie-down point. When particular anchor loops are not needed, the extended loop-ends are merely pushed down into the slot to allow for easy roll and slide of cargo pallets and boxes. The loop-ends are immediately retrievable using a tool like a small screwdriver.

2 Claims, 8 Drawing Sheets

FIG. 11

CARGO FLOOR ANCHORS

BACKGROUND OF THE INVENTION

1. Field of the Invention

The present invention relates to improvements in cargo floor anchor systems for transport tie-down restraints. The improvements herein described will provide a floor anchor system that can provide easily installed anchor points for cargo restraint in transporting vehicles. In particular these anchor points will provide pull-up anchor loops that when not in use are retractable so that there is no protrusion above the surface plane of the cargo floor. A protrusion above the floor is potentially a major inconvenience when sliding and rolling cargo in and out of the cargo van.

2. Background Art

Current cargo transport vehicles typically have the cargo floor area constructed of ¾ inch exterior grade plywood. D-Ring hard points are installed at various locations to facilitate having anchor points available as required to secure particular cargo. These D-Rings are typically assembled into a recessed pan fitting that will require a 3+ inch diameter hole to be put into the floor to install, and are bolted to floor panel with typically four ¼" thru-bolts. These "recessed" floor anchors will protrude ⅜+ inch above floor surface. The lighter duty flush mounted on the floor surface will have an even greater protrusion.

It is well appreciated that any extended transport of heavy equipment and vehicles will require proper restraint of that cargo during transport. A principal component in the restraint methods are the adjustable tie-down straps or cables used to limit movement of the cargo. More recently Applicant has described even further improvements in cargo restraint mechanisms such as those disclosed in U.S. patent application Ser. No. 13/452,779 filed Apr. 20, 2012 for an improved tie-down strap assembly. The floor anchor points for the tie-downs must re-act the potential loads from the individual or combined tie-downs attached at a given anchor.

The operator of a cargo transporter know well the importance and convenience of have multiple tie-down points in a cargo area. They also appreciate a smooth cargo floor to allow for sliding and rolling cargo in and out of the confined cargo van. The inventive cargo anchor described herein will offer an anchor system that is easily installed, and does not protrude above the cargo floor. This inventive anchor system also provides protection to the edges of floor panel from high compressive loads of an impinging anchor web-cable.

SUMMARY OF THE INVENTION

Accordingly, it is the general purpose and object of the present invention to conform a cargo floor anchor system that installs below a floor panel but has an integral web-cable loop attached that stores below surface of a floor panel, but can immediately be pulled up to allow hook-up of cargo restraints.

Further objects of the invention are to provide an improved floor anchor attachment system that attaches only to the underside of a floor panel. The installation will require a very narrow slot in the surface of a floor panel that allows for the web anchor loop. Said anchor loop is contained under the floor by the anchor except when the loop is pulled-up at that particular anchor point.

Briefly, these and other objects are accomplished within the present invention by an anchor that has a rigid frame and also has an attached web cable loop. Said anchor assembly attaches to the lower surface of a floor panel with supplied screws. The installation will require only one slot (typically 1.25×0.20 inch) to be cut through the floor at the desired location. The web-loop of the anchor will be of a sufficient length to extend above the surface of a floor.

When the extended web-loop anchor is not required at a particular point, the web-loop is merely pressed into the floor slot, so that the top of the loop is below the surface of a floor. The excess length of web is stored around the frame of the anchor.

When an extended web-loop will be used to support a significant horizontal load, the web-cable from the anchor will impinge a compression load on the top corner of the affected slot in the floor panel. That top corner of the panel can be reinforced by use of the supplied "cuff", a right angle segment that can be placed on the affected side of the slot to distribute the impinging load. The "cuff" is merely dropped into the slot along-side the web before tightening up the particular tie-down. When the tension is released from the tie-down, the "cuff" can be removed from the slot and stored for future use.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 6 depicts the web routing for the medium and heavy duty versions of the present invention. FIG. 6 Also depicts how with a substantial horizontally directed load, a simple "cuff" reinforcement angle section can be installed into the slot area between the web and floor panel to better distribute the load to edge of panel;

DESCRIPTION OF THE PREFERRED EMBODIMENTS

Figure 1:
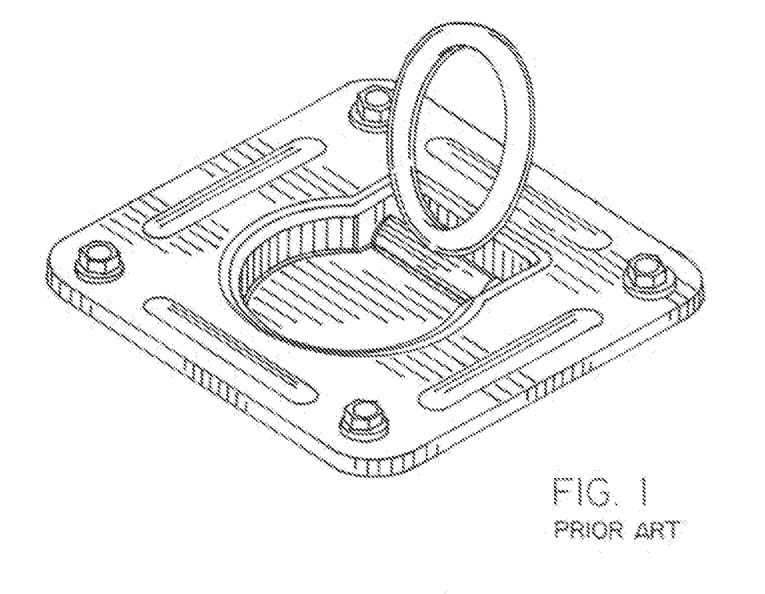
FIG. 1 is perspective illustrations of a prior art cargo floor anchor assembly used in cargo van floors as attach points for cargo restraint cables.
Figure 2:
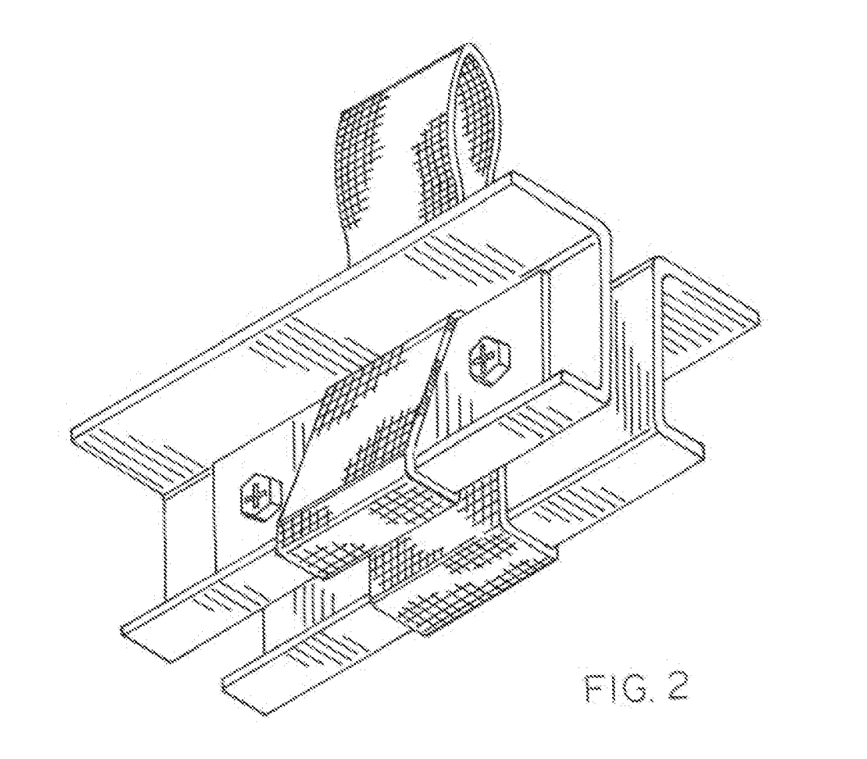
FIGS. 2 and 3 are perspective illustrations of the inventive cargo floor anchor assembly with a heavy duty metal frame design using C Channel sections for the frame beams. The twin structural sections are bolted together with threaded spacers in between. The gap from the spacers provides the separation slot for the web loop. The free-ends of the length of web-cable are locked in position by the pressure of the opposing clamp plates. The floor attachment screws for the anchor assembly will be installed in the gap next to the spacers toward the outside edge of the anchor assembly.
Figure 3:
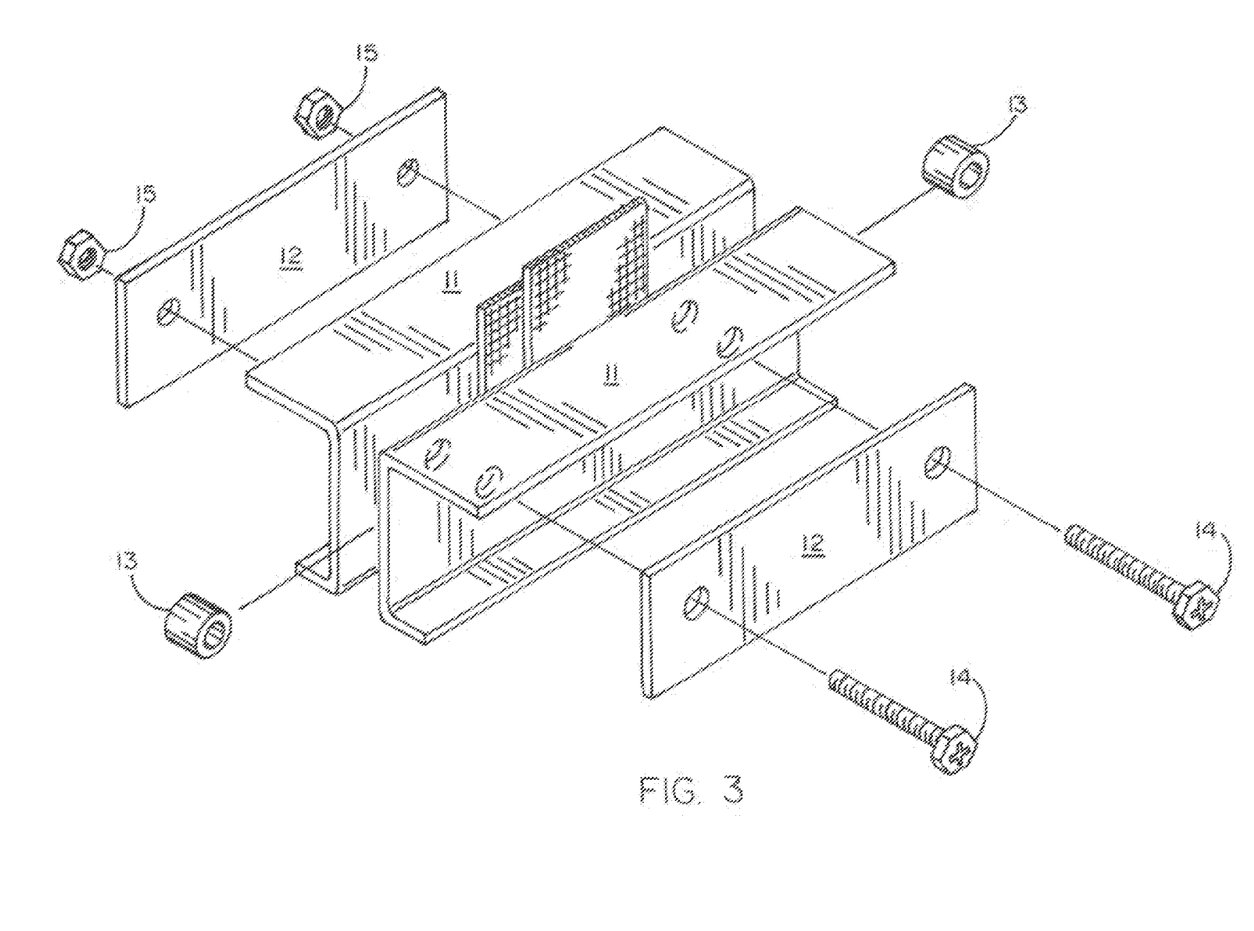

As shown in FIGS. 2 and 3, the inventive device comprises a heavy duty frame assembly and a web-loop. The frame assembly comprises twin parallel channel sections 11 that bolt or fasten together with spacers 13 separating the two channels. The bolts 14 for the two sections will also constrain the two clamp plates 12 to the web-section of the inside of the channels. The C-channel section would typically be manufactured from a steel sheet with a gage thickness of 0.105". Typical thickness for the clamp plate section would be 0.187". The routing of the web-loop 30 starts with one end of the web under a clamp plate 12, then wraps over the top of the clamp plate and angles down to pass around and under the lower flange of the channel. It then goes up between the channel separation area, there the web forms a loop, and then proceeds in reverse order to the clamp section of the second channel. The recommended web loop material would be a woven web of high strength polyester fiber. A typical material would be 0.060 inch t by 1.0 inch width with a breaking strength of 3800 lbs.

Figure 4:
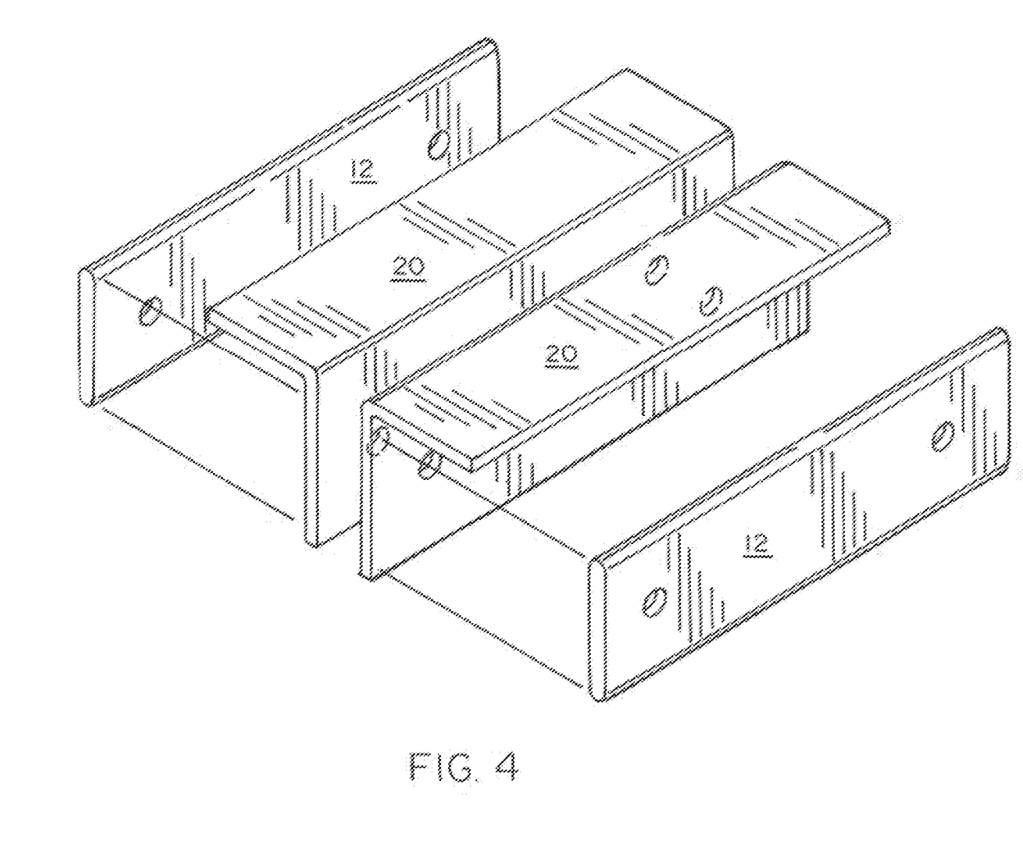
FIG. 4 is a perspective illustration of a medium duty frame design, that uses right-angle sections for the frame instead of channel sections.
Figure 5:
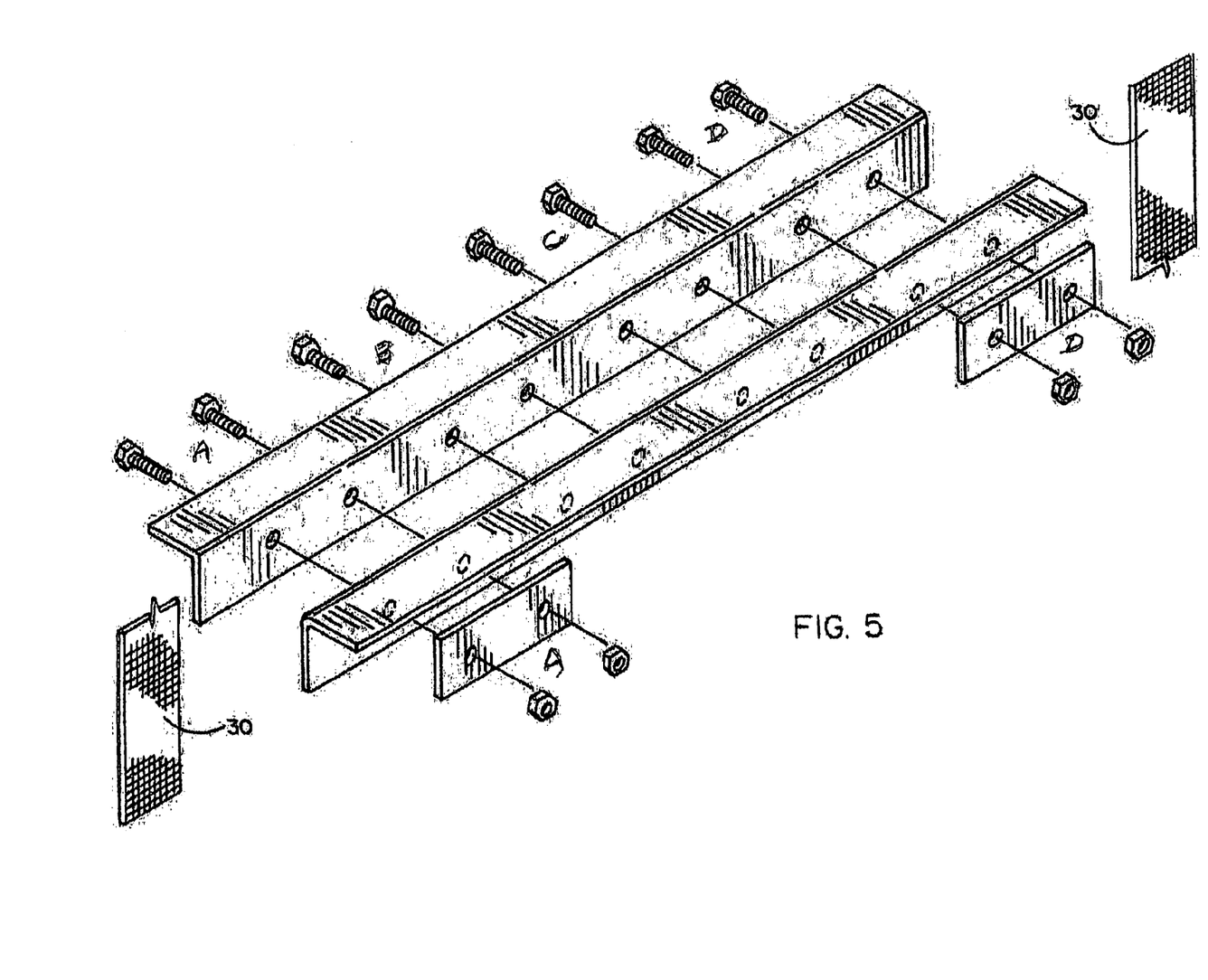
FIG. 5 depicts a medium duty anchor frame assembly with the frame beam-sections having extended length so that one anchor assembly could provide multiple anchor points. As depicted, this unit would be assembled with web-loops captured by the web clamp plates at locations A and D. Additional web loops could be installed at positions B and C.
Figure 6:
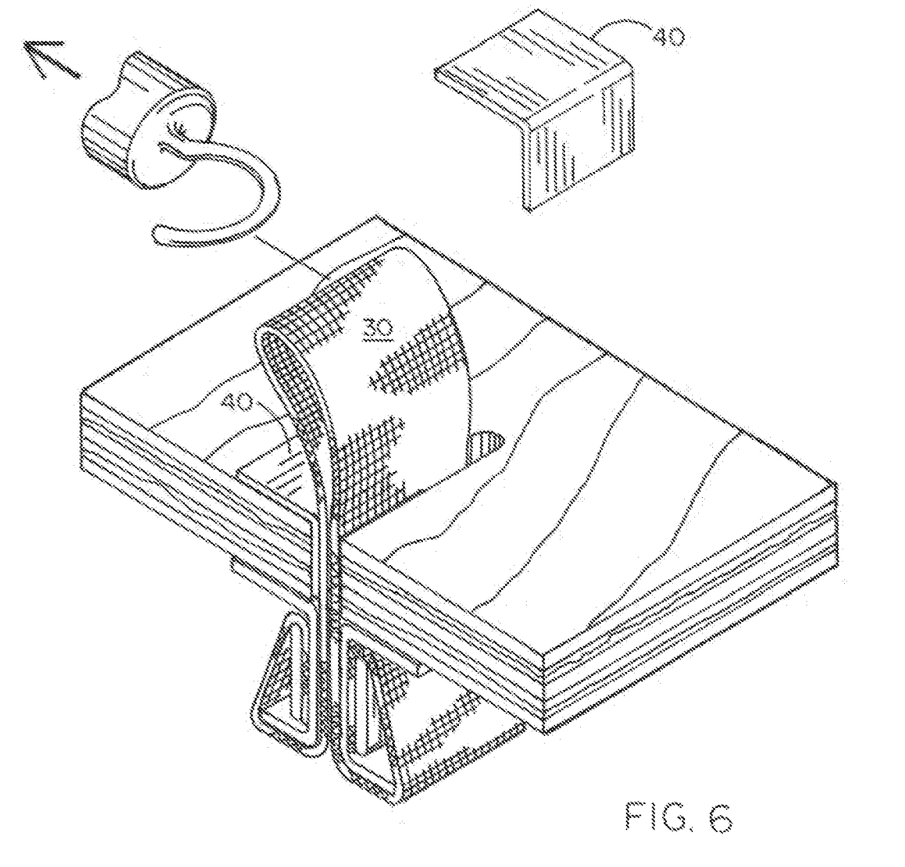

FIG. 4 depicting the medium duty frame design, is identical to that described above, with exception that the frame uses right-angle sections 20 for the frame instead of the C-channels 11. The right angle sections would typically be steel 7/8×7/8×1/8". FIG. 5 depicts a medium duty anchor frame with the frame beam sections of extended length so that one anchor assembly could provide multiple anchor points. The web routing for the web-cable 30 of the medium and heavy duty floor anchors is depicted in FIG. 6.

Figure 7:
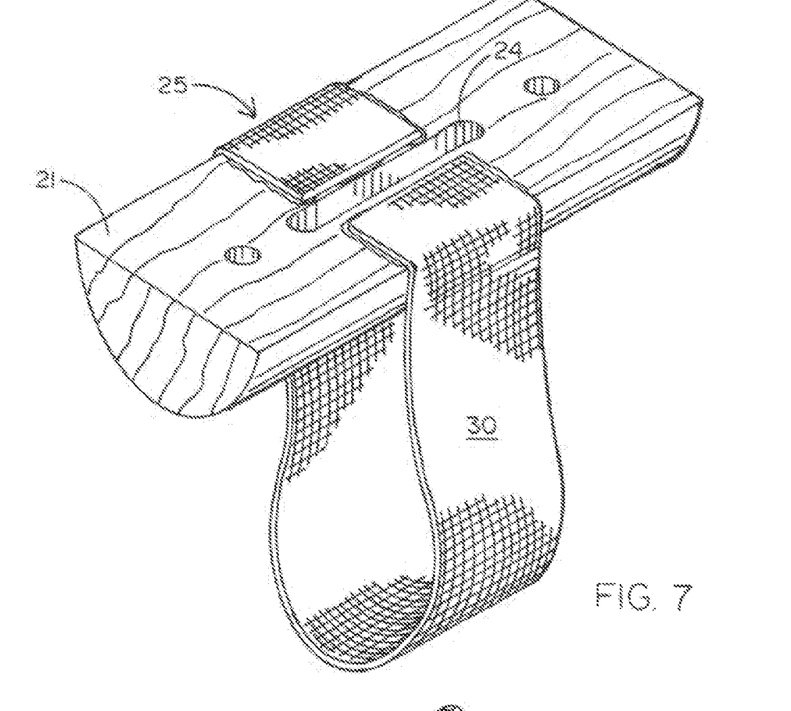
FIGS. 7 and 8 are perspective illustrations of the inventive cargo floor anchor with a light duty frame and web clamp system. This frame could be manufactured by materials such as hard wood (e.g. oak) or structural plastics. In this design the web loop ends are restrained by a combination of clamping force and structural adhesives. This anchor frame would be attached to the underside of a floor through the attach points shown.
Figure 8:
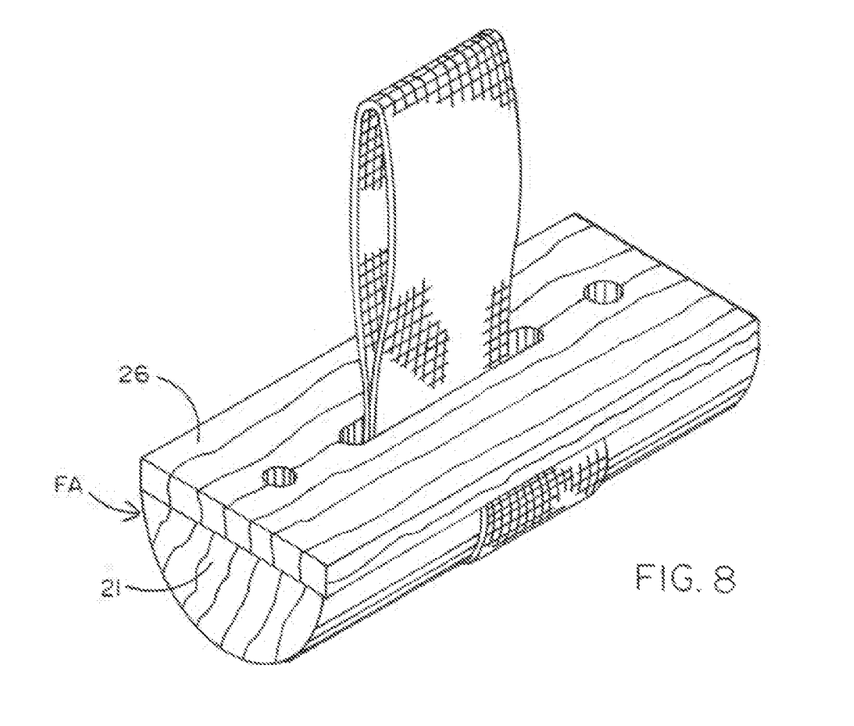

FIGS. 7 and 8 depict an alternate light-duty version of the inventive cargo floor anchor. It is basically the same concept, but it could be manufactured from plastic or high strength hardwood. In this case, instead of channel sections, a half-round segment 21 with typical radius of 0.75" would have a slot 24 through the mid-section to accommodate the parallel web ends from the web-loop. A relief 25 would be machined into the half round segment; such relief is sized to provide the location for the attachment of the web cable ends to the frame of the anchor. A matching closure plate 26 for the half-round section will apply mechanical clamping forces to restrain the web ends. This closure plate would normally be the same type of material as the half round and it would be attached to the half-round section using structural adhesives and appropriate screws. In this alternate design, the web-loop is clamped/bonded into the machined relief area between the half round section and the closure plate. The web then is routed around the circumference and then passes up through the machined slot area of the half round, forms the loop-end and then continues back through the slot and is further routed to the opposite web clamp area between the half-round and the closure plate.

FIGS. 7 and 8 depict an alternate light-duty version of the inventive cargo floor anchor. It is basically the same concept, but it could be manufactured from plastic or high strength hardwood. In this case, instead of channel sections, a half-round segment 21 would have a slot 24 through the mid-section to accommodate the parallel web ends from the web-loop. A relief 25 would be machined into the half round segment; such relief is sized to provide the location for the attachment of the web cable ends to the frame of the anchor. A matching closure plate 26 for the half-round section will apply mechanical clamping forces to restrain the web ends. This closure plate would normally be the same type of material as the half round and it would be attached to the half-round section using structural adhesives and appropriate screws. In this alternate design, the web-loop is clamped/bonded into the machined relief area between the half round section and the closure plate. The web then is routed around the circumference and then passes up through the machined slot area of the half round, forms the loop-end and then continues back through the slot and is further routed to the opposite web clamp area between the half-round and the closure plate.

Figure 9:
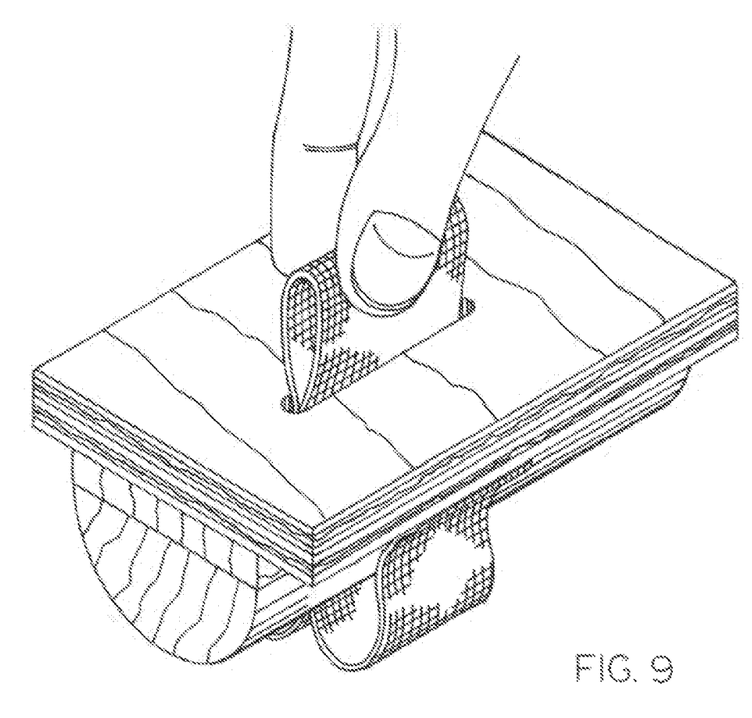
FIGS. 9 and 10 are perspectives illustrations of the present invention depicting how when a particular anchor point is not needed, the web-loop is pressed down so that the loop rests in the floor slot, and the excess web is along-side the anchor frame.
Figure 10:
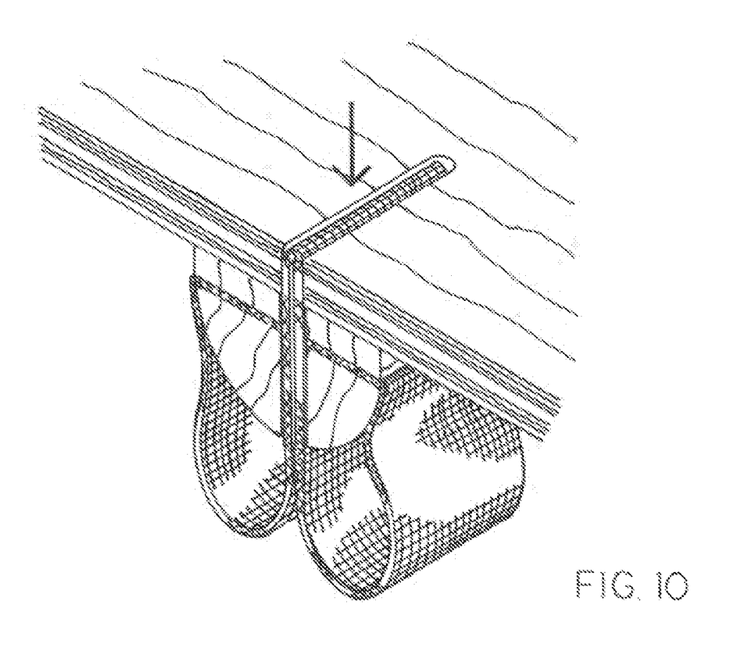

FIGS. 9 and 10 depict how when a particular anchor point is not needed, the end of the web-loop is pressed down to move the top of the web loop to below level of the floor surface. The excess web stores along-side of the anchor frame.

Figure 11:
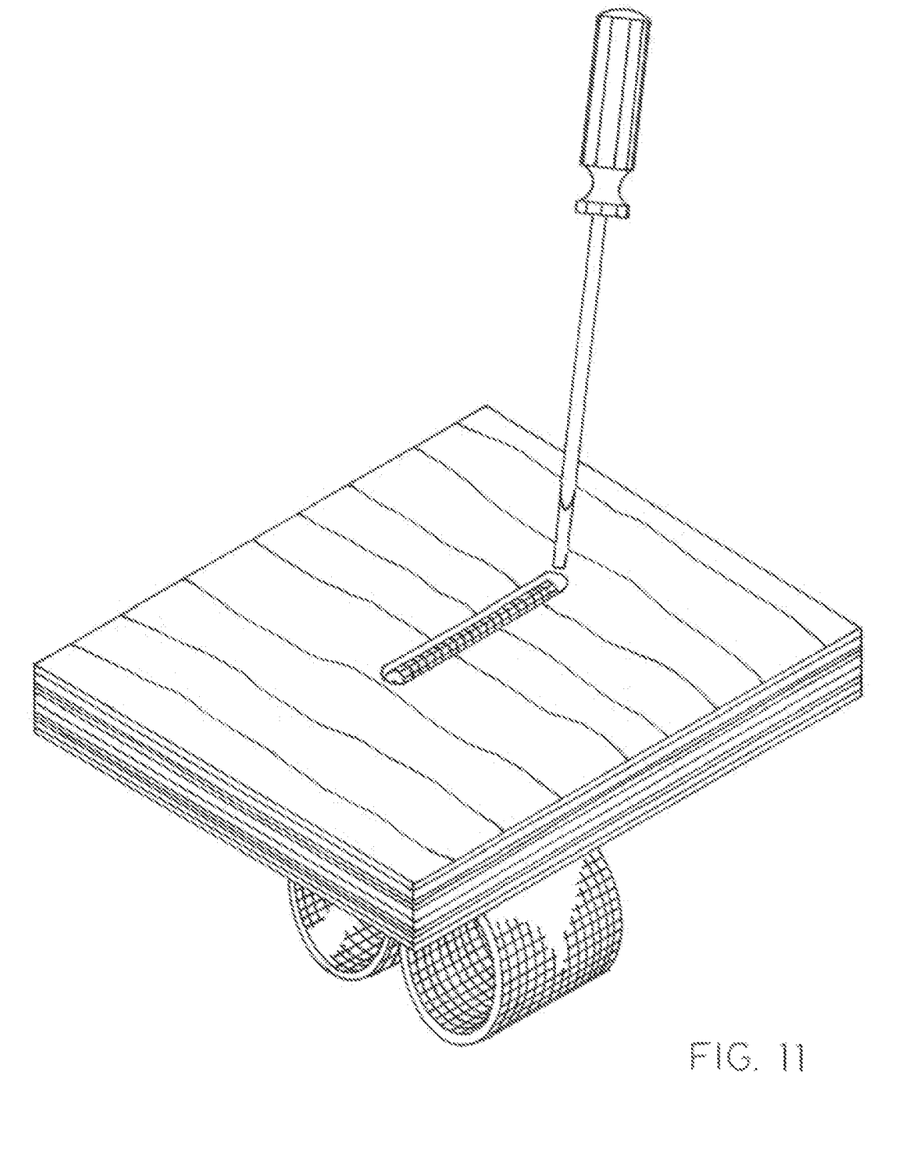
FIG. 11 is a perspective illustration of the present invention depicting how the top of the web-loop is retrieved from its stored location below the surface of a floor panel.

FIG. 11 is a perspective illustration depicting how the top of the web-loop is retrieved from its stored position below the surface of the floor panel.

It will be appreciated that the foregoing arrangement provides convenience of multiple floor anchors without annoyance from protrusions onto the floor surface. The rugged design and simplicity of installation and slot edge reinforcement would combine to offer added security and durability to a cargo anchor system.

Obviously, many modifications and variations of the instant invention can be effected without departing from the spirit of the teachings herein. It is therefore intended that the scope of the invention be determined solely by the claims appended hereto.

What is claimed is:

1. A sub-floor anchor system for a cargo transport vehicle comprising a transport vehicle floor panel with an elongated aperture there-through; a length of flexible webbing strap forming a loop; a pair of back to back C-Shaped channels securing the strap there-between such that the strap at least partially wraps around a leg portion of each of the channels; the channels each abutting an underside of the floor panel; a respective planar clamp plate abutting and located on an opposing side of each of the channels; the clamp plates and the channels each defining an aperture there-through receiving a bolt; wherein the loop of webbing strap is extendable through the elongated aperture to a position above the floor panel to provide for cargo securement; and further wherein the loop of webbing strap is retractable to a position below an upper surface of the floor panel when not in use.

2. A sub-floor anchor system for a cargo transport vehicle comprising a transport vehicle floor panel with an elongated aperture therethrough; a length of flexible webbing strap forming a loop; a half-round anchor segment constructed of hard-wood with a semi-circular cross-section and defining a flat rectangular surface; the anchor segment additionally comprising an elongated aperture matching the panel aperture and a relief portion machined into the anchor segment; the webbing strap being received within the relief portion and extending at least partially around a semi-circular arc of the anchor segment; a planar closure plate attached to the anchor segment flat rectangular surface using structural adhesive or screws so as to secure and clamp ends of the webbing strap between the closure plate and the anchor segment; wherein the loop of webbing strap is extendable through the floor aperture to a position above the floor panel to provide for cargo securement; and further wherein the loop of webbing strap is retractable to a position below an upper surface of the floor panel when not in use.

* * * * *